US010699203B1

(12) United States Patent
Ozcaglar et al.

(10) Patent No.: US 10,699,203 B1
(45) Date of Patent: Jun. 30, 2020

(54) UPLIFT MODELING WITH IMPORTANCE WEIGHTING

(71) Applicant: Amazon Technologies, Inc., Seattle, WA (US)

(72) Inventors: Cagri Ozcaglar, Seattle, WA (US); Vishnu Parimi, Redmond, WA (US); Roopesh Ranjan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 927 days.

(21) Appl. No.: 15/272,075

(22) Filed: Sep. 21, 2016

(51) Int. Cl.
*G06Q 10/00* (2012.01)
*G06Q 30/02* (2012.01)
*G06Q 50/00* (2012.01)
*G06K 9/62* (2006.01)
*G06N 7/00* (2006.01)
*G06F 16/28* (2019.01)
*G06F 16/2457* (2019.01)

(52) U.S. Cl.
CPC ....... *G06N 7/005* (2013.01); *G06F 16/24578* (2019.01); *G06F 16/285* (2019.01)

(58) Field of Classification Search
CPC .. G06N 7/005; G06F 16/285; G06F 16/24578
USPC ...................................................... 706/1–62
See application file for complete search history.

(56) References Cited

U.S. PATENT DOCUMENTS

| 8,224,665 B2* | 7/2012 | Morris | G06F 19/328 705/2 |
| 8,583,470 B1* | 11/2013 | Fine | G06Q 40/04 705/7.31 |
| 2011/0123100 A1* | 5/2011 | Carroll | G06N 5/003 382/155 |
| 2016/0350946 A1* | 12/2016 | Schieke | G06T 11/008 |

OTHER PUBLICATIONS

Rubin, Donald B., et al. "Estimating the Casual Effects of Marketing Interventions Using Propensity Score Methodology", Statistical Science, 2006 vol. 21, No. 2, 206-222, 17 pages.
Radcliffe, Nicholas J., et al. "Real-World Uplift Modelling with Significance-Based Uplift Trees", Portrait Technical Report TR-2011-1, Stochastic Solutions White Paper 2011, 33 pages.

* cited by examiner

*Primary Examiner* — Brandon S Cole
(74) *Attorney, Agent, or Firm* — Knobbe, Martens, Olson & Bear, LLP (57) ABSTRACT

Systems are provided to select targets for communications, designed to cause or provoke the targets to perform a desired action, using bias-corrected models that predict the effect of such communications on the targets. Data regarding previous actions taken by potential targets for communications—also referred to as "candidates"—can be analyzed to determine whether there is a difference in actions taken by candidates who have received prior communications in comparison with candidates who have not received the prior communications. Biases in the selection of candidates to receive the prior communications can be corrected by weighting the data associated with the selected candidates to more closely match the distribution of candidates not selected to receive the prior communications.

20 Claims, 5 Drawing Sheets

UPLIFT MODELING WITH IMPORTANCE WEIGHTING

BACKGROUND

Computing devices and communication networks can be utilized to exchange content and other information. In a common application, one computing device (such as a server computing device) can provide a communication to another computing device (such as a client computing device) to cause or provoke an action by the other computing device or a user of the other computing device. The communication may be sent as an email, a web page, an interstitial page, a content item to be displayed on a web page, or the like.

In some scenarios, particular users or computing devices can be selected to receive communications based on prior experience with such communications, and/or based on other criteria. For example, a server computing device may select, from a universe of available users, a subset or "treatment set" of users to whom communications are to be provided. The treatment set can be selected based on heuristics, predicted likelihoods of users to perform a desired action, demographic characteristics of users, and the like. From the perspective of the sender of the communications, the performance of the selection methods (or of the system in general) can be measured in terms of the number or percentage of users performing the desired action after receiving the communications.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to systems that select targets for communications designed to cause or provoke the targets to perform a desired action. The targets are selected using bias-corrected models that predict the effect of such communications on the targets. Data regarding previous actions taken by potential targets for communications—also referred to as "candidates"—can be recorded or otherwise obtained. The data can be analyzed to determine whether there is a difference in actions taken by candidates who have received prior communications in comparison with candidates who have not received the prior communications. The difference in the actions taken by the different groups can, in some cases, be attributed to the effect of the prior communications. To improve the reliability that the measured effect (e.g., performance of the desired action) is indeed caused by providing the communications rather than by some other event, certain biases in the data can be identified and corrected. For example, bias in the selection of candidates to receive the prior communications may have resulted in a non-random set of such candidates and, therefore, a non-random distribution of data regarding the candidates that performed the desired action after receiving the communications. Such bias can be corrected by weighting the data associated with the selected candidates to more closely match the distribution of candidates not selected to receive the prior communications (or the population of all candidate targets). In this way, a more accurate comparison between the two groups can be made.

Some conventional systems select targets for communications based on an expectation or prediction that the targets will take a desired action after receiving such communications. When candidates who have received the prior communications tend to take a desired action more often than candidates who have not received the communications, the same candidates can be selected to again receive communications in the future. However, the selection of targets for initial communications may introduce a bias in the data upon which future candidate determinations will be made. For example, the initial targets may be selected, either intentionally or unintentionally, based on their overall likelihood to perform a desired action, such as purchasing a product, obtaining an application, providing information, accessing content, and the like. The overall likelihood that the targets will perform the desired action may be unaffected—or affected very little—by the communications with which they are provided. Thus, it may appear as though the communications are effective if the data shows that the targets of the communications perform the desired action after receiving the communications, even if there was no change (or very little change) that was actually caused by the communication. In addition, some targets may be less likely to perform a desired action after receiving a communication (e.g., providing communications to such targets may have a negative effect on their likelihood to perform the desired action). However, if such targets nevertheless perform the desired action at a high enough rate, they may continue to be provided with communications. Systems that use such methods of selecting candidates for communications may cause a sub-optimal increase (or fail to actually cause any increase at all) in the performance of desired actions.

Some aspects of the present disclosure relate to generating a model to predict or otherwise determine the degree to which providing a communication to a candidate will actually cause a change in the likelihood that the candidate performs a desired action. The model may include a first component, also referred to as a "control" model, which predicts the likelihood of performing the desired action without receiving the communication. The model may also include a second component, also referred to as a "treatment" model, which predicts the likelihood of performing the desired action after receiving the communication. The model that includes both the control model and the treatment model may be referred to as an "uplift" model. The difference in the predictions of the control model and treatment model for any particular candidate corresponds to the effect caused by or otherwise associated with—providing the candidate with the communication. Therefore, the uplift model can be used to select targets for future communications based on whether the communications are expected to increase the likelihood that the targets perform a desired action, rather than based on whether the targets are likely to perform the action at all. In some embodiments, the output of the uplift model may be positive values for those candidates who are predicted to be more likely to perform the desired action after receiving the communication than without receiving it. The output of the uplift model may be zero (or a value substantially close to zero) for candidates for whom the communication is not predicted to have any effect on the likelihood of performing the action. The output of the uplift model may be negative values for those candidates who are predicted to be less likely to perform the desired action after receiving the communication than without receiving it.

Additional aspects of the disclosure relate to identifying and reducing bias in the treatment model and/or the data from which the treatment model is generated. As described above, some conventional systems send communications to targets who are likely to perform a desired action, regardless of whether the communications will have any positive effect (or any effect whatsoever) on that likelihood. Therefore, existing information recorded in connection with such processes may tend to be biased rather than truly random or otherwise representative of the universe of candidates. To overcome these limitations, the data regarding the candidates selected to receive prior communications—the "treatment set"—can be weighted to correspond to the data regarding the candidates not selected to receive the communications—the "control set." In this way, a comparison between the output of a treatment model and a control model can more accurately reflect the true uplift caused by providing the communications, rather than reflecting the selection bias inherent in prior treatment sets.

Although aspects of some embodiments described in the disclosure will focus, for the purpose of illustration, on particular examples of communications and desired actions, the examples are illustrative only and are not intended to be limiting. In some embodiments, the systems and techniques described herein may be applied in the absence of electronic communications or conscious performance of desired actions by targets. The systems and techniques described herein may be used to model the effect that is attributable to any treatment applied to a treatment set and not applied to a control set, or, more generally, to model the effect that is attributable to any event that occurs with respect to one set of subjects but not to another set. For example, the techniques described herein may be used to reduce bias and determine the actual effects of treatments and events in pharmaceutical and medical device efficacy testing, therapeutic studies, and the like. Various aspects of the disclosure will now be described with regard to certain examples and embodiments, which are intended to illustrate but not limit the disclosure.

Network-Based Prediction and Communication Environment

Figure 1:
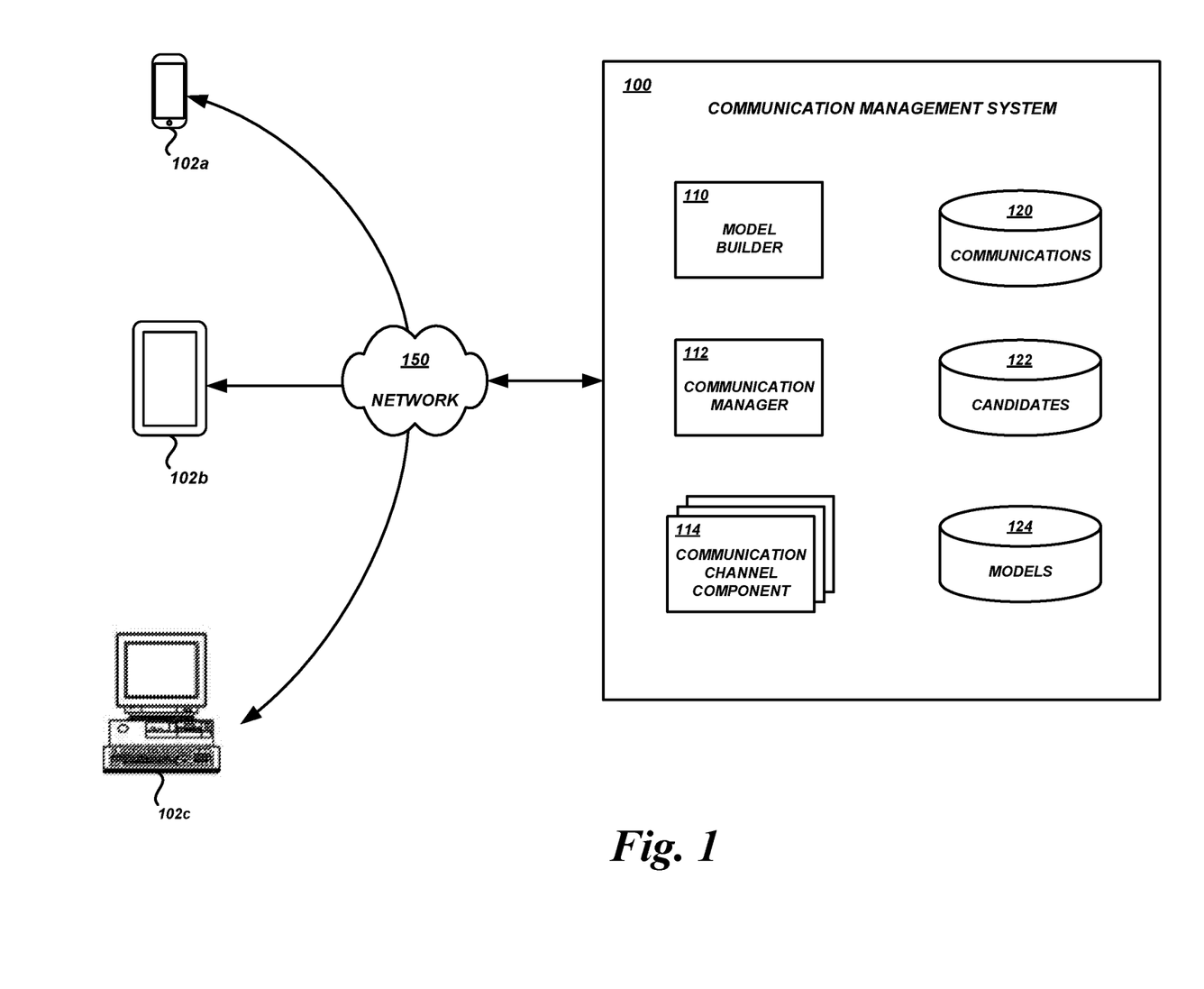
FIG. 1 is a block diagram of an illustrative computing environment including a communication management system and various user devices according to some embodiments.

With reference to an illustrative embodiment, FIG. 1 shows a network environment in which aspects of the present disclosure may be implemented. As shown, the network environment may include a communication management system 100 and various user devices 102a, 102b, and 102c (collectively "user devices 102"). The user devices 102 and communication management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The communication management system 100 may include various components for providing the features described herein. Illustratively, the communication management system 100 may include a model builder 110 configured to generate uplift models for use in determining which candidates to target with communications. The communication management system 100 may also include a communication manager 112 configured to manage the transmission of communications and/or to track subsequent performance of various actions. The communication management system 100 may also include any number of communication channel components 114 configured to handle transmission of various communications, including emails, content pages, phone calls, advertising buys, and the like.

The communication management system 100 may also include various data stores to store data and/or files in connection with uplift model generation and usage. For example, the communication management system 100 may include a communications data store 120 to store data about the communications that have been previously transmitted. The communication management system 100 may also include a candidate data store 122 to store data about the targets of prior communications, actions performed by the candidates before and/or after receiving (or not receiving) communications, and the like. The communication management system 100 may also include a models data store 124 to store the uplift models that are generated and used by the communication management system 100. The data stores and other components of the communication management system 100 shown in FIG. 1 and described herein are illustrative only, and are not intended to be limiting. In some embodiments, fewer, additional, and/or alternative data stores and/or components may be implemented by a communication management system 100.

The communication management system 100 may be implemented on one or more physical server computing devices that provide computing services and resources. In some embodiments, the communication management system 100 (or individual components thereof, such as the model builder 110, communication manager 112, communication channel components 114, various data stores, etc.) may be implemented on one or more host devices, such as blade servers, midrange computing devices, mainframe computers, desktop computers, or any other computing device configured to provide computing services and resources. For example, a single host device may execute one or more model builders 110, communication managers 112, communication channel components 114, data stores 120, 122, and/or 124, some combination thereof, etc. The communication management system 100 may include any number of such hosts.

In some embodiments, the features and services provided by the communication management system 100 may be implemented as web services consumable via the communication network 150. In further embodiments, the communication management system 100 (or individual components thereof) is provided by one more virtual machines implemented in a hosted computing environment. The hosted computing environment may include one or more rapidly provisioned and released computing resources, such as computing devices, networking devices, and/or storage devices.

A hosted computing environment may also be referred to as a cloud computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user—also referred to herein as a "candidate" or "target" for a communication—may operate a user device 102 to access and interact with communications provided by the communication management system 100 and/or to perform other computing tasks which may or may not include performance of the desired actions associated with the communications. In some embodiments, a user may launch specialized application software, such as a mobile application, or general application software, such as a browser application, to interact with the communications provided by the communication management system 100 and/or to perform other computing tasks.

A user may operate a user computing device 102 to browse network content (e.g., web pages), communicate with other users or other entities, etc. Illustratively, a user may view and purchase products from a remote system, such as a server system hosting a retail web site. The remote system may track the user's activities associated with the system's services, including which products the user viewed, which search queries the user submitted, which products the user has purchased in the past, and the like. In some embodiments, the remote system may track the user's activities in substantially real-time, such as in response to submission of individual browse requests by the user device 102. In other embodiments, the remote system may receive tracking information asynchronously or in a batch. For example, information may be maintained by application software executing on the user device 102 (e.g., a specialized application executing on a mobile device) and provided to the communication management system 100 on a schedule or on demand. The remote system may perform similar operations for all other users (or some subset thereof) accessing the remote system.

The remote system may include, employ, or otherwise be associated with a communication management system 100. The remote system may use the communication management system 100 to send a communication to the user device 102 in order to cause or provoke the user to perform an action desired by the remote system. For example, the communication management system may send an advertisement for a particular product or an upcoming sale to the user device 102. The communication management system 100 may then obtain information regarding whether the user received the advertisement, interacted with any features of the advertisement (e.g., clicked on a link or button), and subsequently made a purchase associated with the advertisement. This process of sending a communication to a user device 102 and then tracking subsequent action associated with the communication may be repeated for any number of user devices 102. The set of similar communications sent to different user devices 102 may be referred to as a "campaign." The individual user devices 102 selected to participate in the campaign may be selected based on some heuristic, such as user devices 102 of users having a demonstrated interest in, or propensity to, purchase items similar to those in the advertisement.

Figure 3:
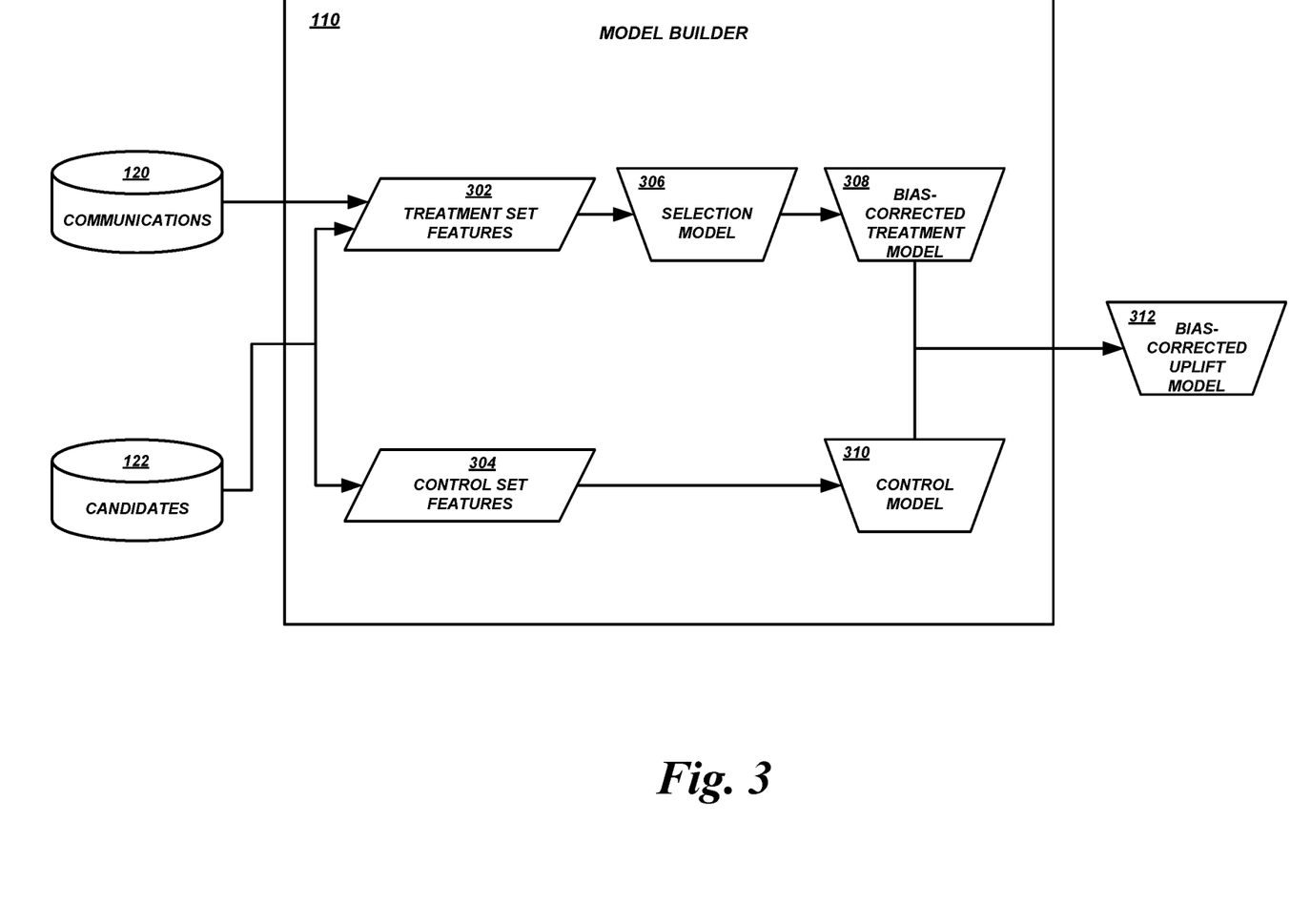
FIG. 3 is a block diagram of an illustrative model builder generating a bias-corrected uplift model.
Figure 4:
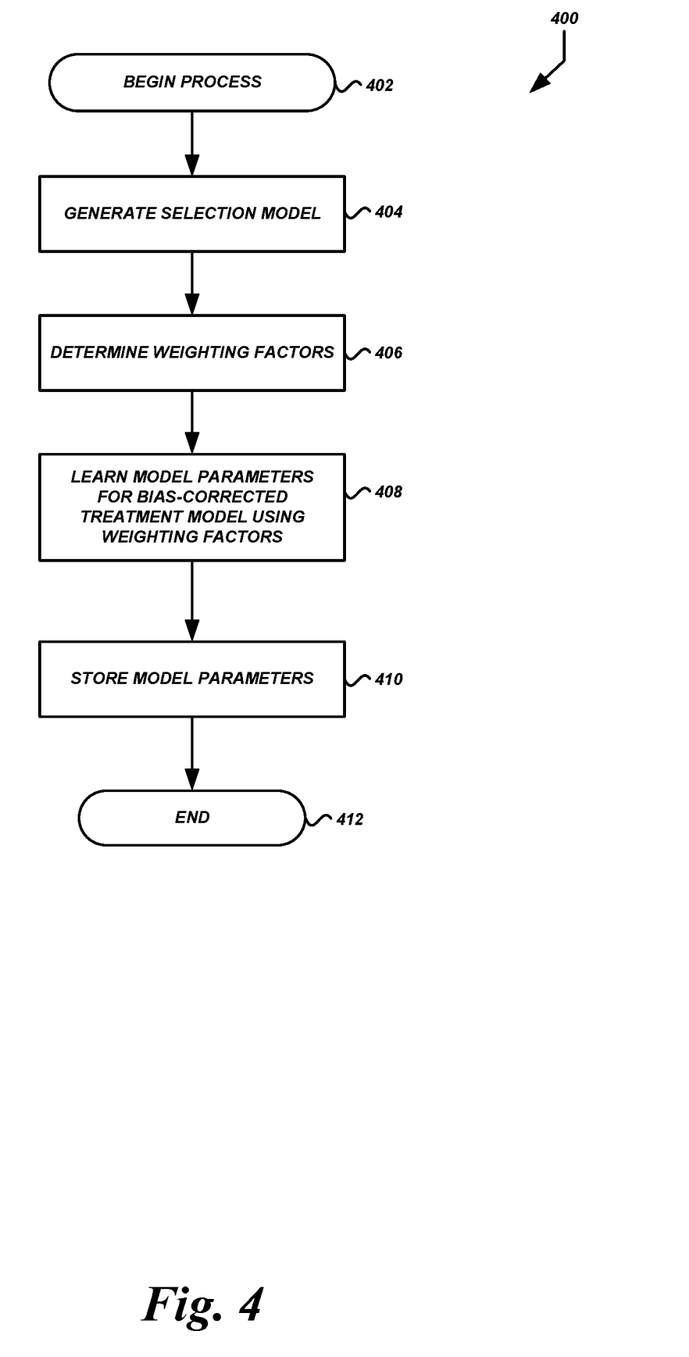
FIG. 4 is a flow diagram of an illustrative process for generating a bias-corrected component of an uplift model.

The communication management system 100 can analyze data regarding actions that the users performed after receiving the communications. As described in greater detail below, the communication management system 100 can then generate a model to predict the effect that communications have on provoking desired actions. Illustratively, the communication management system 100 may generate a control model that predicts the likelihood that users will perform the desired action without receiving a communication like the one described above. This model may be generated as a regression model (e.g., a logistic regression model) from data regarding users not selected to receive the communication (users who are not "treated"). The communication management system can also generate a treatment model that predicts the likelihood that users will perform the desired action after receiving a communication like the one described above. This model may be generated as a regression model from data regarding the user's actions taken subsequent to receiving the communications (users who are treated). Instead of simply combining the two models into a conventional uplift model that computes the difference of the control model and the treatment model, the communication management system 100 may first generate a substantially unbiased (or substantially bias-corrected) version of the treatment model. For example, the communication management system 100 may apply weighting to the data used to generate the treatment model to more closely correspond to data regarding users in the control model. Example processes and data flows for generating and using such bias-corrected models are shown in FIGS. 2-4 and described in greater detail below.

Example Process for Generating Uplift Models

Figure 2:
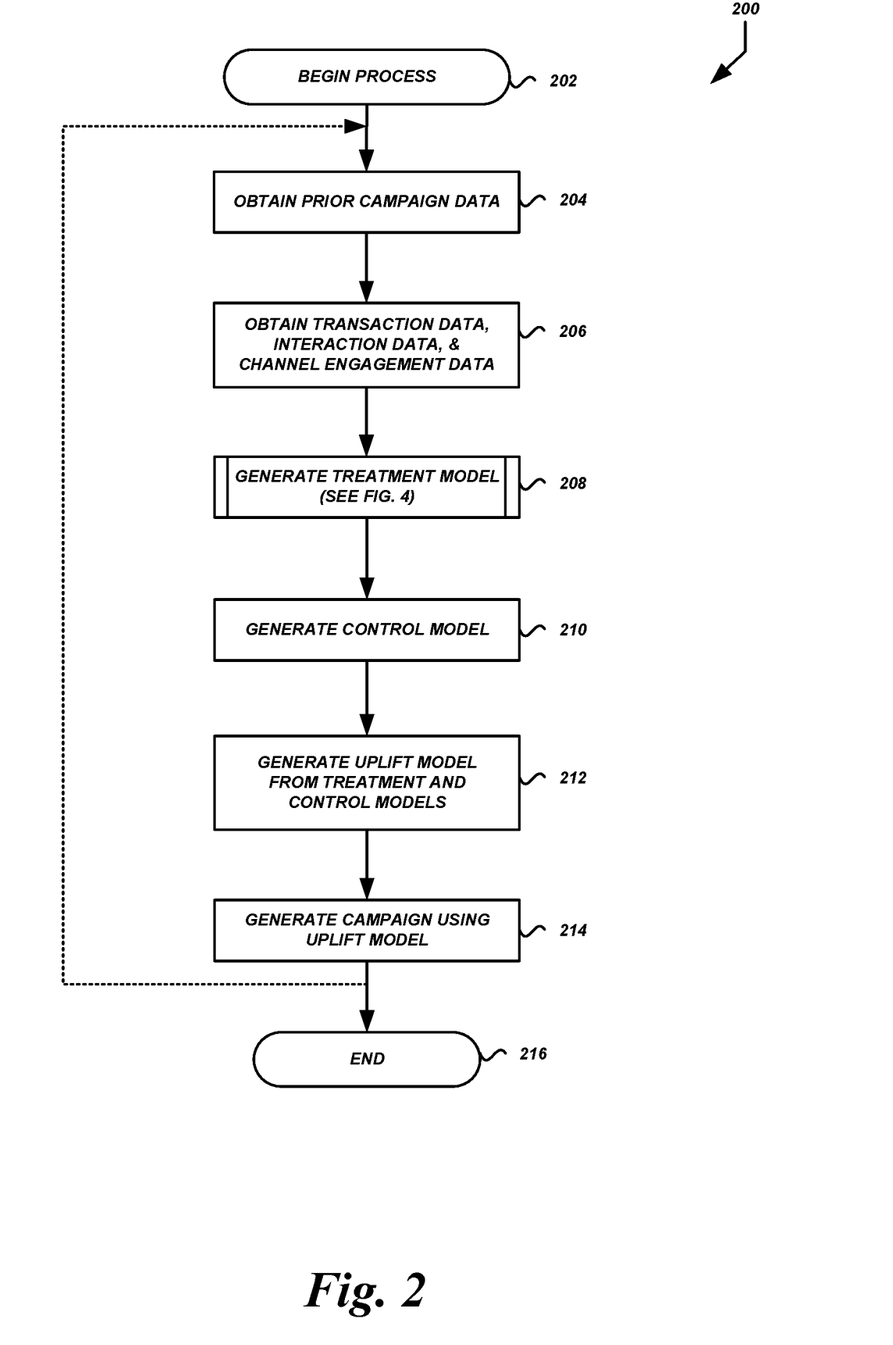
FIG. 2 is a flow diagram of an illustrative process for implementing a bias-corrected uplift model and selecting communication targets.

FIG. 2 is a flow diagram of an illustrative process 200 that may be executed by a model generator 110 or some other module or component of the communication management system 100. Advantageously, the model generator 110 may execute the process 200 to generate bias-corrected uplift models that predict the effect expected to be caused by (or otherwise attributable to) providing a communication to a particular target, rather than simply predicting the likelihood that a target will perform a desired action after the target receives the communication.

The process 200 shown in FIG. 2 begins at block 202. The process 200 may begin in response to an event, such as when execution of a model generator 110 begins, when initiated by a system administrator, etc. When the process 200 is initiated, a set of executable program instructions stored on one or more non-transitory computer-readable media (e.g., hard drive, flash memory, removable media, etc.) may be loaded into memory (e.g., random access memory or "RAM") of a computing device of the communication management system 100, such as the computing device 500 shown in FIG. 5. The executable instructions may then be executed by a hardware-based computer processor (e.g., a central processing unit or "CPU") of the computing device. In some embodiments, the process 200 or portions thereof may be implemented on multiple processors, serially or in parallel.

At block 204, the model generator 110 or some other module or component of the communication management system 100 can obtain data regarding one or more previous campaigns. For example, the model generator 100 can execute the process 200 to generate and use an uplift model for an upcoming campaign involving advertising for widgets on sale at a retail web hosted by a remote system. The communication management system 100 may obtain data regarding prior campaigns involving advertising for widgets. The data may be obtained from a communication data store 120 if the communication management system 100 managed the prior campaign. Alternatively or in addition, the data may be obtained from a remote system and stored in the communication data store 120. Illustratively, the data may include records regarding which candidates received communications, the type or content of the communications, whether the candidates subsequently performed a desired action (e.g., browsing for or purchasing widgets), how long after receiving the communications the candidates performed the desired action, etc.

At block 206, the model generator 110 or some other module or component of the communication management system 100 can obtain data regarding transactions and other interactions performed by or otherwise involving the individual candidates, and the channel engagement of the individual candidates. For example, the data may reflect individual user interactions with the web site hosted by the remote system, individual user interactions with (or responses to) communications provided via particular communication channels, etc. The data may be obtained from a candidates data store 122 if, e.g., the communication management system 100 is integrated with the remote system hosting the web site. Alternatively or in addition, the data may be obtained from the remote system and stored in the candidates data store 120.

In one specific non-limiting embodiment, the data obtained at blocks 204 and/or 206 may include: transactional features based on candidate purchases in the last i years; interaction features based on browse sessions in the last j months; and channel engagement features based on candidate engagement with prior communications in the last k months.

Transactional features may be aggregated at a group or category level (e.g., data regarding transactions involving a particular product category such as books, clothing, etc.). Illustratively, transactional features may include a Cartesian product of multiple dimensions, such as: [1] product category; [2] time series, ranging from 1 week to 2 years (e.g., about 1 week, about 2 weeks, about 4 weeks, about 1 year, about 2 years, etc.); and [3] purchase metrics, including the number of units purchased, revenue resulting from the purchase, and a binary indicator of whether the candidate made a purchase from the product category during the given time period. For example, a candidate-level transactional feature can be the number of units in the books category purchased by the candidate within the last 2 weeks.

Interaction features may be based on page views, clicks, and/or sessions in the last month associated with a particular product category. Illustratively, interaction features may include a Cartesian product of multiple dimensions, such as: [1] product category; [2] time series, ranging from 1 week to 1 month (e.g., about 1 week, about 2 weeks, about 3 weeks, about 4 weeks, etc.); and [3] browsing interaction metrics, including the number of pages viewed, the number of click/tap/selection events initiated, the number of sessions, and a binary indicator of whether the candidate had a page view, click/tap/selection event, and/or browse session associated with the product category during the given time period. For example, a candidate-level interaction feature can be the number of page views in the books category by the candidate within the last 1 week.

Communication channel engagement features may be based on candidate-level history of engagement with communications of a particular type or "channel" sent by the communication management system 100. Illustratively, communication channel engagement features may include a Cartesian product of multiple dimensions, such as: [1] channel campaign history (e.g., product category/type of communication); [2] time series, ranging from 1 week to 6 months (e.g. about 1 week, about 2 weeks, about 6 months, etc.); and [3] channel engagement metrics, including the number of communications received/accessed/activated/opted-out from a corresponding communication channel campaign during the given time period. For example, a candidate-level communication channel engagement feature can be the number of emails, regarding best-selling books, opened by the candidate in the last 4 weeks.

At block 208, the model generator 110 or some other module or component of the communication management system 100 can build a bias-corrected treatment model. The bias-corrected treatment model can provide the probability that a candidate in the treatment set (e.g., a candidate who has been provided with a communication intended to provoke a desired action) will perform a desired action, given that the candidate is associated with a particular set of features. The features may include those described above, such as transactional features, interaction features, and communication channel engagement features. A weighting factor may be used to correct for selection bias in the data from which the treatment model is being generated. For example, data associated with candidates who are under-represented (or feature sets that are under-represented) in the treatment set in comparison with the control set may be assigned a weighting factor that increases the contribution of such data/candidates to the treatment model. Data associated with candidates who are over-represented (or feature sets that are over-represented) in the treatment set in comparison with the control set may be assigned a weighting factor that decreases the contribution of such data/candidates to the treatment model. In some embodiments, the bias-corrected treatment model may be specified according to equation [1] below:

$$M^{T,apprx} = P(Y=1 | x, f^{\pm}_x, x \in T', w(x)) \quad [1]$$

where $M^{T,apprx}$ is the approximation of the treatment model without the selection bias described above, Y indicates whether the candidate took the desired action, $f^{\pm}_x$ is the set of candidate-specific features for candidate x, T' is the biased treatment set, and w(x) is the weighting factor applied to the data for candidate x (or to candidates with features similar to those of candidate x). One example process for determining weighting factors and generating a bias-corrected treatment model is shown in FIG. 4 and described in greater detail below.

At block 210, the model generator 110 or some other module or component of the communication management system 100 can build a control model. The control model can provide the probability that a candidate in the control set (e.g., a candidate who has not been provided with a communication intended to provoke a desired action) will perform a desired action, given that the candidate is associated with a particular set of features. The features may include those described above, such as transactional features and interaction features. The features used for the control set model may not include communication channel engagement features, because the control set candidates have not received the communications that are being tested. Also in contrast the treatment model, no weighting factor may be used for generating the control model in cases where there is no selection bias in the data from which the control model is being generated. In some embodiments, the control model may be specified according to equation [2] below:

$$M^C = P(Y=1 | x, f_x, x \in C) \quad [2]$$

where $M^C$ is the control model, Y indicates whether the candidate took the desired action, $f_x$ is the set of candidate-specific features for candidate x, and C is the control set.

At block 212, the model generator 110 or some other module or component of the communication management system 100 can build a bias-corrected uplift model using the bias-corrected treatment model and control model generated above. The bias-corrected uplift model—also referred to simply as the "uplift model" for convenience—can provide the difference between the bias-corrected treatment model and the control model for a particular candidate. The difference between those models corresponds to the effect that a treatment is expected to have on a particular candidate. That is, the difference corresponds to the difference in outcomes caused by treatment, rather than simply being the outcome after treatment. In some embodiments, the uplift model may be specified according to equation [3] below:

$$M^{T,apprx} = M^{T,apprx} - M^C \qquad [3]$$

where $M^{T,apprx}$ is the uplift model corresponding to the difference between the bias-corrected treatment model $M^{T,apprx}$ and the control model $M^C$.

FIG. 3 shows illustrative data flows and transformations by the model builder 110 during generation of an uplift model. In some embodiments, as shown in FIG. 3, and described above with respect to blocks 204-212, data is retrieved from data stores, such as the communications data store 120 and the candidates data store 122. The data can include treatment set features 302 and control set features 304, such as those described above. From the treatment set features 302, the model builder 110 can generate a selection model 306, and then a bias-corrected treatment model 308, as described in greater detail below. From the control set features 304, the model builder 110 can generate a control model 310. The model builder can generate a bias-corrected uplift model 312 from the bias-corrected treatment model 308 and the control model 310. The bias-corrected uplift model 312 can be stored in a models data store 124 for use in generating later campaigns.

Returning to FIG. 2, at block 212 the communication management system 100 or some component thereof, such as the communication manager 112, can generate a campaign using the bias-corrected uplift model. The communication manager 112 can use the uplift model to identify candidates to whom communications are to be provided. For example, the communications manager can select the top n candidates having the greatest expected increase in likelihood to perform a desired action (e.g., purchase a widget) after receiving a particular communication (e.g., an email advertisement for the widget). As another example, the communications manager can select the top p percent of candidates having the greatest expected increase. As a further example, the communications manager can select all candidates having an expected increase greater than a threshold h. These examples are based on choosing the candidates for whom the communications are predicted to have the greatest impact in terms of increasing the likelihood of performing a desired action. In some embodiments, candidates may be selected for treatment based on any combination of criteria such as high uplift, high initial likelihood, and/or high expected return on investment ("ROI") in the process of generating communications and monitoring results, or on any of the aforementioned criteria individually.

The process 200 may return to previous blocks as-need to, e.g., analyze the outcome of the campaign initiated at block 214 and generate a new uplift model using the results. At block 216, the process 200 can terminate.

Example Process for Generating Bias-Corrected Treatment Models

FIG. 4 is a flow diagram of an illustrative process 400 that may be executed by a model generator 110 or some other module or component of the communication management system 100. Advantageously, the model generator 110 may execute the process 400 to generate a treatment model in which the selection bias in the underlying data from which the model is generated is reduced or eliminated. The bias-corrected treatment model can predict a likelihood that a candidate will perform a desired action after receiving a communication or otherwise being "treated."

The process 400 shown in FIG. 4 begins at block 402. The process 400 may begin in response to an event, such as when execution of a model generator 110 begins, upon reaching block 208 of process 200 described above, etc. When the process 400 is initiated, a set of executable program instructions stored on one or more non-transitory computer-readable media (e.g., hard drive, flash memory, removable media, etc.) may be loaded into memory (e.g., random access memory or "RAM") of a computing device of the communication management system 100, such as the computing device 500 shown in FIG. 5. The executable instructions may then be executed by a hardware-based computer processor (e.g., a central processing unit or "CPU") of the computing device. In some embodiments, the process 400 or portions thereof may be implemented on multiple processors, serially or in parallel.

At block 404, the model generator 110 or some other module or component of the communication management system 100 can build a selection model. The selection model is a model of the initial selection bias with which candidates were selected for treatment in the prior campaign (e.g., the campaign that generated the data from which the current uplift model is being generated). In some embodiments, the selection model may be specified according to equation [4] below:

$$M_s = P(x \in T' | x \in U, f_x^+) \qquad [4]$$

where $M_s$ is the selection model corresponding to the probability that a particular candidate x, from the universe of candidates U, is selected to be included in the treatment set T' based on the set of candidate-specific features $f_x^+$ for the candidate. Illustratively, the candidate-specific features $f_x^+$ may include any or all of the features described above, including transaction features, interaction features, and communication channel engagement features.

At block 406, the model generator 110 or some other module or component of the communication management system 100 can determine weighting factors for the data regarding the treatment set from the prior campaign. The weighting factors, also referred to herein as "importance weights" or simply as "weights" for convenience, are used to reduce or correct the selection bias in the selection model in order to make the data more closely resemble data for a randomly selected subset of the universe of candidates U. The weights accomplish this by adjusting the contribution of certain data to the bias-corrected treatment model $M^{T,apprx}$. For example, the weights can reduce the contribution of data regarding candidates who are over-represented in the treatment set T' (e.g., candidates associated with a set of features that are over-represented, or the sets of features themselves that are over-represented). The weights can increase the contribution of data regarding candidates who are under-represented in the treatment set T' (e.g., candidates associated with a set of features that are under-represented, or the sets of features themselves that are under-represented). In some embodiments, the weights may be determined according to equation [5] below:

$$w(x) = \frac{1}{P(x \in T' \mid x \in U, f_x^+)} = \frac{1}{M_S(x)} \quad [5]$$

where w(x) is weight for candidate x and corresponds to the inverse of the selection model output $M_s(x)$ for the candidate. An alternative but equivalent way to determine the weight for any particular candidate x is to use the ratio of probability density functions for candidate-specific features of candidate x in the unbiased universe of candidates U over the biased treatment set T', i.e.: $f_U(x)/f_T(x)$, where $f_U(x)$ is the probability density function of candidates x in U having features $f_x$, and $f_T(x)$ is the probability density function of candidates in T' having features $f_x^+$.

At block 408, the model generator 110 or some other module or component of the communication management system 100 can generate the bias-corrected treatment model $M^{T,apprx}$ using machine learning to determine the parameters of the model. In some embodiments the bias-corrected treatment model is a regression model, and learning the parameters of the model may be accomplished according to equation [6] below:

$$M^{T,apprx} = P(Y = 1 \mid x, f_x^+, x \in T', w(x)) \quad [6]$$
$$= \operatorname*{argmin}_\beta \sum_{x \in T'} w_x L(y_x, S(\beta' f_x^+))$$

where β is the set of model parameters to be learned, L is the loss function, S is the sigmoid function, $w_x$ is the weight for candidate x, and $y_x$ is the label for candidate x indicating whether the candidate did or did not perform the desired action after being treated. In the example shown in equation [6], the parameters β to be learned are those that produce the minimum value of the summed products of weights $w_x$ and loss function L values for each candidate x in the treatment set T'. The sigmoid function S generates output between two values (e.g., between 1 and 0), corresponding to the probability that the candidate will take the desired action (e.g., 1) or not take the desired action (e.g., 0). The loss function L produces a measurement of the error of the sigmoid function S for the candidate-specific features $f_x^+$ with respect to the correct label $y_x$. In some embodiments, the loss function may be a logistic loss function, a squared loss function, a Hinge loss function, a Huber loss function, or a cross-entropy loss function.

At block 410, the model generator 110 or some other module or component of the communication management system 100 can store the model (or the learned parameters of the model) in the models data store 126. The process 400 may then terminate at block 412. In some embodiments, process 400 is a subroutine of process 200, and execution may return to process 200 after bock 410.

Execution Environment

Figure 5:
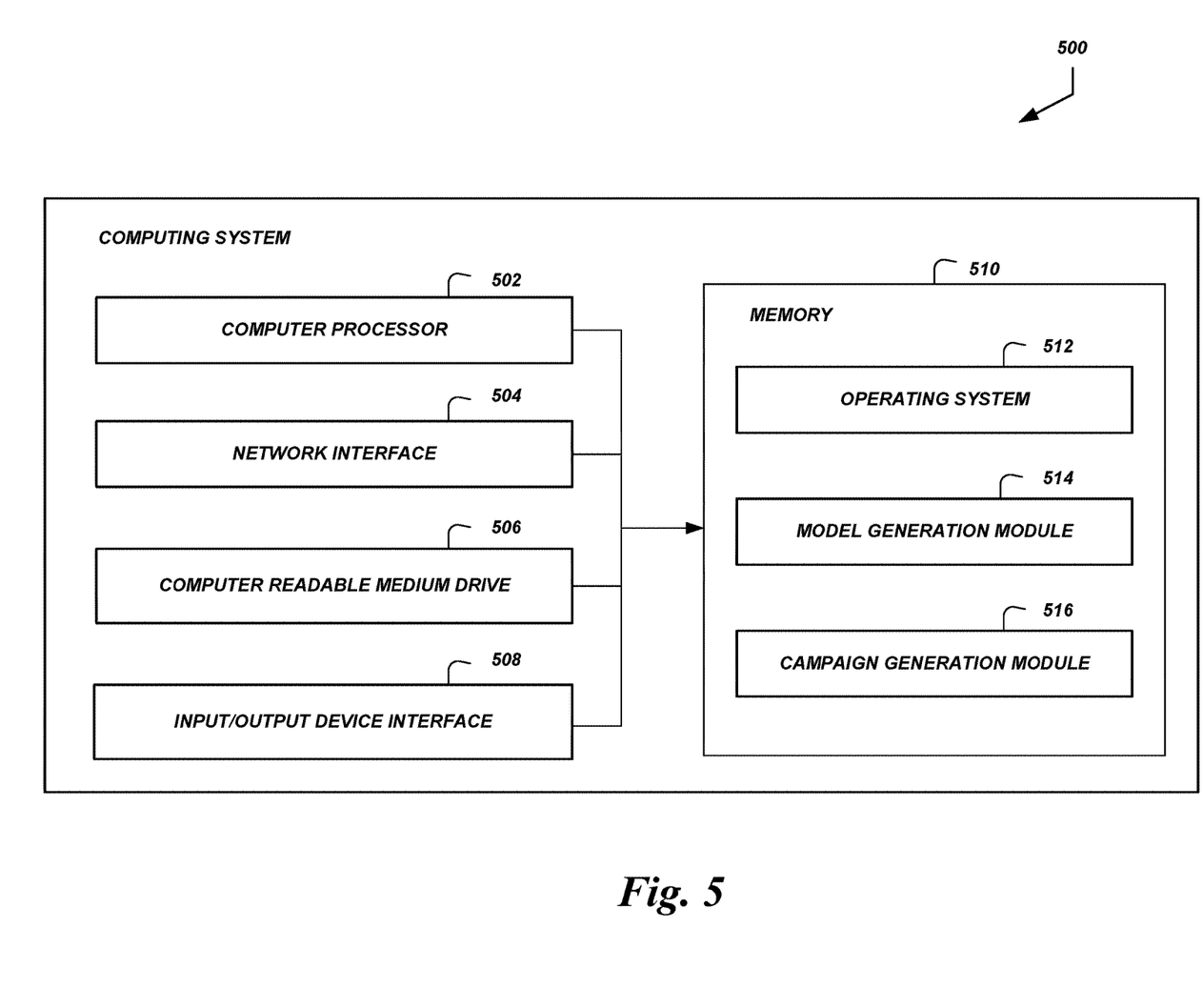
FIG. 5 is a block diagram of an illustrative computing device configured to generate and/or use bias-corrected models.

FIG. 5 illustrates an example computing system 500 configured to execute the processes and implement the features described above. In some embodiments, the computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SDDs"), flash drives, and/or other persistent non-transitory computer-readable media; an input/output device interface 508, such as an IO interface in communication with one or more microphones; and one or more computer readable memories 510, such as random access memory ("RAM") and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 512 that provides computer program instructions for use by the computer processor 502 in the general administration and operation of the computing system 500. The computer readable memory 510 can further include computer program instructions and other information for implementing aspects of the present disclosure. For example, in one embodiment, the computer-readable memory 510 may include a model generation module 514 that implements the model generator 110 and performs the processes 200 and/or 400 described above (or portions thereof). As another example, the computer-readable memory 510 may include a campaign generation module 516 that implements the communication manager 112 and performs operations described above for using a bias-corrected uplift model to generate a communication campaign.

In some embodiments, multiple computing systems 500 may communicate with each other via their respective network interfaces 504, and can implement model generation and/or campaign generation separately (e.g., each computing system 500 may execute one or more separate instances of the processes 200 and/or 400), in parallel (e.g., each computing system 500 may execute a portion of a single instance of a process 200 and/or 400), etc. For example, a distributed computing environment may provide hosted capabilities for implementing the systems and methods described herein and various alternatives, including: linear supervised learning algorithms (e.g., Vowpal Wabbit or "VW") to implement Stochastic Gradient Descent ("SGD"), Bayesian Linear probit ("BLIP"), or Bayesian Linear Regression ("BUR"); nonlinear supervised learning algorithms such as random forests and decision trees; unsupervised clustering algorithms such as the k-means algorithm, etc. In order to provide such capabilities for predictive analytics, the distributed computing environment can provide integration points so that users can select the appropriate abstraction boundaries for their use case (e.g., bring-your-own-model interfaces, support for user-defined preprocessing functions, etc.). In addition, to handle potential issues related to the interface between user data and the modeling platform, the distributed computing environment may be fully integrated with the environment from which the data to be used in the modelling is obtained. To enable users to quickly deploy machine learning models, the distributed computing environment can provide automation of common manual machine learning tasks such as algorithm selection, feature selection, model tuning, and model performance evaluation. In addition, to help users interpret the model results, the distributed computing environment can provide feature importance metrics, various performance measures from which to select, and integration with visualization tools to enable users to easily explore correlations between inputs and outputs.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors programmed by the executable instructions to at least:
obtain first feature data regarding interactions of a first set of candidates with content regarding an item category, wherein the interactions of the first set of candidates are performed after a first communication regarding the item category is transmitted to the first set of candidates;
obtain second feature data regarding interactions of a second set of candidates with content regarding the item category, wherein the interactions of the second set of candidates are performed after the first communication regarding the item category is transmitted to the first set of candidates, and wherein the first communication regarding the item category is not transmitted to the second set of candidates;
generate a treatment model using the first feature data, wherein output of the treatment model comprises a first probability that a candidate, associated with a set of features, will perform an interaction with content regarding the item category after receiving a communication regarding the item category, wherein the treatment model uses a weighting factor to adjust output of the treatment model for an overrepresented subset of candidates in the first set of candidates, and wherein the overrepresented subset of candidates are overrepresented in the first set of candidates in comparison with the second set of candidates;
generate a control model using the second feature data, wherein output of the control model comprises a second probability that the candidate, associated with the set of features, will perform an interaction with content regarding the item category without receiving a communication regarding the item category;
generate an uplift model using the treatment model and the control model, wherein the uplift model produces a difference between the first probability and the second probability generated for the candidate associated with the set of features, and wherein the difference corresponds to an expected effect, of a communication regarding the item category, on the candidate associated with the set of features; and
determine to transmit a second communication to the candidate associated with the set of features based at least partly on the expected effect of the second communication.

2. The system of claim 1, wherein the executable instructions that program the one or more processors to generate the treatment model comprise instructions to determine a parameter of the treatment model based at least partly on minimizing a value of summed products of weighting factors and loss function values for individual candidates in the first set of candidates, wherein a loss function value for a first candidate of the first set of candidates is based at least partly on a sigmoid function value produced using the parameter and first feature data associated with the first candidate.

3. The system of claim 1, wherein the treatment model uses a second weighting factor to adjust output of the treatment model for an underrepresented subset of candidates in the first set of candidates, and wherein the underrepresented subset of candidates are underrepresented in the first set of candidates in comparison with the second set of candidates.

4. The system of claim 1, wherein the interactions of the first set of candidates with content regarding the item category comprise initiation of transactions for an item in the item category.

5. A computer-implemented method comprising:
as performed by a computing system configured to execute specific instructions,
generating a first model component, wherein output of the first model component comprises a first probability that a candidate associated with a set of features will perform a desired action after occurrence of an event, wherein a weight of the first model component adjusts output of the first model component based at least partly on a ratio of: (1) a first set of candidates associated with the set of features, with respect to (2) a second set of candidates associated with the set of features, wherein the first set of candidates is underrepresented with respect to the second set of candidates, and wherein the weight increases the first probability based at least partly on the first set of candidates being underrepresented;
generating a second model component, wherein output of the second model component comprises a second probability that the candidate associated with the set of features will perform the desired action without occurrence of the event;
generating a model comprising the first model component and the second model component; and
determining, using the model, to initiate the event with respect to the candidate associated with the set of features based least partly on a difference between the first probability and the second probability.

6. The computer-implemented method of claim 5, wherein the first model component comprises a regression model.

7. The computer-implemented method of claim 5, wherein the set of features comprises data regarding at least one of: a transaction initiated by the candidate and involving an item; an interaction by the candidate with content regarding the item; and an interaction by the candidate with a communication regarding the item.

8. The computer-implemented method of claim 5, wherein generating the first model component comprises determining a parameter of the first model component based at least partly on minimizing a value of summed products of weights and loss function values for individual candidates in the first set of candidates, and wherein a loss function value for a first candidate of the first set of candidates is based at least partly on a function value produced using the parameter and first feature data associated with the first candidate.

9. The computer-implemented method of claim 8, wherein the loss function value comprises a value computed using one of: a logistic loss function, a squared loss function, a Hinge loss function, a Huber loss function, or a cross-entropy loss function.

10. The computer-implemented method of claim 5, wherein generating the first model component is performed using feature data regarding the first set of candidates, wherein generating the second model component is performed using feature data regarding the second set of candidates.

11. The computer-implemented method of claim 5, wherein initiation of the event comprises transmitting a communication regarding an item, and wherein the desired action comprises initiation of a transaction involving an item.

12. The computer-implemented method of claim 5, further comprising obtaining feature data regarding interactions of the first set of candidates with content regarding an item category, wherein the interactions of the first set of candidates are performed after a communication regarding the item category is transmitted to the first set of candidates, and wherein the first model component is generated using the feature data.

13. The computer-implemented method of claim 12, further comprising obtaining feature data regarding interactions of the second set of candidates with content regarding the item category, wherein the interactions of the second set of candidates are performed after the communication regarding the item category is transmitted to the first set of candidates, and wherein the communication regarding the item category is not transmitted to the second set of candidates.

14. A non-transitory computer storage medium storing executable code, wherein the executable code configures a computing system to at least:
  generate a first model component, wherein output of the first model component comprises a first probability that a candidate associated with a set of features will perform a desired action after occurrence of an event, wherein a weight of the first model component adjusts output of the first model component based at least partly on a ratio of: (1) a first set of candidates associated with the set of features, with respect to (2) a second set of candidates associated with the set of features, wherein the first set of candidates are overrepresented with respect to the second set of candidates, and wherein the weight reduces the first probability based at least partly on the first set of candidates being overrepresented;
  generate a second model component, wherein output of the second model component comprises a second probability that the candidate associated with the set of features will perform the desired action without occurrence of the event;
  generate a model comprising the first model component and the second model component; and
  determine, using the model, to initiate the event with respect to the candidate associated with the set of features based least partly on a difference between the first probability and the second probability.

15. The non-transitory computer storage medium of claim 14, wherein the first model component comprises a regression model.

16. The non-transitory computer storage medium of claim 14, wherein the set of features comprises data regarding at least one of: a transaction initiated by the candidate and involving an item; an interaction by the candidate with content regarding the item; and an interaction by the candidate with a communication regarding the item.

17. The non-transitory computer storage medium of claim 14, wherein the executable code further configures the computing system to determine a parameter of the first model component based at least partly on minimizing a value of summed products of weights and loss function values for individual candidates in the first set of candidates, and wherein a loss function value for a first candidate of the first set of candidates is based at least partly on a function value produced using the parameter and first feature data associated with the first candidate.

18. The non-transitory computer storage medium of claim 14, wherein to generate the first model component, the executable code configures the computing system to use feature data regarding the first set of candidates, and wherein to generate the second model component, the executable code configures the computing system to use feature data regarding the second set of candidates.

19. The non-transitory computer storage medium of claim 14, wherein the executable code further configures the computing system to obtain feature data regarding interactions of the first set of candidates with content regarding an item category, wherein the interactions of the first set of candidates are performed after a communication regarding the item category is transmitted to the first set of candidates, and wherein the first model component is generated using the feature data.

20. The non-transitory computer storage medium of claim 19, wherein the executable code further configures the computing system to obtain feature data regarding interactions of the second set of candidates with content regarding the item category, wherein the interactions of the second set of candidates are performed after the communication regarding the item category is transmitted to the first set of candidates, and wherein the communication regarding the item category is not transmitted to the second set of candidates.

* * * * *

UNITED STATES PATENT AND TRADEMARK OFFICE
CERTIFICATE OF CORRECTION

PATENT NO. : 10,699,203 B1
APPLICATION NO. : 15/272075
DATED : June 30, 2020
INVENTOR(S) : Cagri Ozcaglar Page 1 of 1

It is certified that error appears in the above-identified patent and that said Letters Patent is hereby corrected as shown below:

In the Specification

In Column 8, Line 37, delete "$f^{\pm}_{x}$" and insert --$f^{+}_{x}$--.

In Column 12, Line 48, delete "("BUR");" and insert --("BLIR");--.

In the Claims

In Column 16, Line 35, Claim 5, delete "based least" and insert --based at least--.

In Column 17, Line 46, Claim 14, delete "based least" and insert --based at least--.

Signed and Sealed this
Eighth Day of September, 2020

Andrei Iancu
*Director of the United States Patent and Trademark Office*